United States Patent [19]

Apfel

[11] 4,315,207
[45] Feb. 9, 1982

[54] CURRENT CONTROLLED BATTERY FEED CIRCUIT

[75] Inventor: Russell J. Apfel, San Jose, Calif.

[73] Assignee: Advanced Micro Devices, Inc., Sunnyvale, Calif.

[21] Appl. No.: 161,490

[22] Filed: Jun. 20, 1980

[51] Int. Cl.³ ............................................... G05F 1/46
[52] U.S. Cl. ................................. 323/284; 323/272; 179/70
[58] Field of Search ............... 323/271, 272, 282, 284, 323/285; 179/16 F, 70, 77

[56] References Cited

U.S. PATENT DOCUMENTS

| | | | |
|---|---|---|---|
| 3,579,090 | 5/1971 | Madsen | 323/284 |
| 3,870,896 | 3/1975 | Kiko | 179/77 X |
| 4,074,182 | 2/1978 | Weischedel | 323/272 X |
| 4,176,255 | 11/1979 | Rudisill, Jr. | 179/70 X |
| 4,203,141 | 5/1980 | Bishop et al. | 323/284 X |

Primary Examiner—William M. Shoop
Assistant Examiner—Peter S. Wong
Attorney, Agent, or Firm—Gary T. Aka; J. Ronald Richebourg

[57] ABSTRACT

A battery feed circuit with a current-controlled feedback loop supplying DC current to a load. The circuit is particularly adjustable to telephone systems and is characterized by low power dissipation.

16 Claims, 10 Drawing Figures

FULLY DIFFERENTIAL BATTERY FEED CIRCUIT

CURRENT GENERATOR

Fig 9

CURRENT CONTROLLED BATTERY FEED CIRCUIT

BACKGROUND OF THE INVENTION

1. Field of the Invention

This invention relates to electrical circuitry feeding DC bias and AC signal power to a load, and more particularly, to a battery feed circuit useful in a telephone system for supplying direct current from a central office to a telephone subscriber loop.

2. Prior Art

In a telephone system power must be fed from a central office to its various subscribers by subscriber loops. The equipment of the subscriber, such as a telephone, must receive enough electric current to function properly. The electric circuit in the central office supplying the current to the load formed by the transmission line and the subscriber equipment is known as a battery feed circuit.

The battery feed circuit supplies a DC current to the subscriber. Upon the DC current are superimposed AC signals, usually of audio frequency, by which information is conveyed to the subscriber from the central office and from the subscriber to the central office and onward.

To protect the battery feed circuit and other central office equipment, DC source impedances are used in the circuit to avoid undesired high currents which may occur upon a short circuit in the subscriber loop. However, a straightforward solution with the use of a high source impedance will reduce the maximum length of the transmission line forming the subscriber loop. Some of the different approaches used in trying to match the DC source impedance with the conditions imposed by the load of the transmission line are described in U.S. Pat. No. 4,176,255, issued Nov. 27, 1979 by J. A. Rudisill.

A related problem facing battery feed circuits is that of power dissipation. A battery feed circuit manufactured as an integrated circuit, would be physically compact and reliable, but integrated circuits have a low ability of dissipating power. A battery feed circuit with low power would satisfy the requirements imposed by an integrated circuit. Moreover, it is desirable that the overall battery feed system, including the battery feed circuit and the transmission line, dissipate as little power as possible for energy savings.

SUMMARY OF THE INVENTION

These and other problems are overcome or substantially mitigated by a novel battery feed circuit having its driving voltage which supplies the load current to a load modified by a negative feedback control from the load current. The battery feed circuit having a source of DC voltage comprises a feedback means responsive to the load current for generating a feedback current proportional to the load current, an impedance means responsive to the feedback current for generating a control voltage proportional to the feedback current, a bias means responsive to the DC source voltage for generating a biased voltage having a predetermined relationship with respect to the source voltage, and an amplifier means responsive to the biased voltage and the control voltage for generating an output voltage in a negative feedback relationship to the load current.

Thus, the load current controls the output voltage which drives the load current through the load. By being in a negative feedback relationship to the output voltage, an increase in the load current tends to reduce the output voltage, thereby avoiding an unnecessary increase in the load current. Moreover, the impedance means which generates the first voltage from the feedback current further comprises a current generating means which is connected to the circuit in such a manner that the control voltage is generated only when the feedback current is above a predetermined value. The result of this is that no feedback occurs until after the load current increases above another predetermined value. This guarantees that the battery feed circuit will feed a minimum load current through the transmission line.

There is further provided a battery feed circuit for supplying a DC load current to a load from a source of DC voltage comprising a feedback means responsive to the load current for generating a current proportional to the load current, an impedance means responsive to the feedback current for generating a first voltage component proportional to the feedback current, the impedance means being further responsive to the DC source voltage for generating a first voltage substantially equal to the source voltage modified by the control voltage component, a regulator means supplied by the DC voltage source and responsive to the control voltage for generating an output voltage substantially equal to the control voltage, a bias means responsive to the control voltage for generating a biased voltage having a predetermined relationship to the first voltage and amplifier means supplied by the regulator output voltage and responsive to the biased voltage for generating an output voltage in a negative feedback relationship to the load current, the amplifier output voltage driving the load current to the transmission line. This circuit has a regulator which supplies the ampilifier which generates the driving voltage for the load current. This results in a more stable circuit operation and, possibly, a further reduction in power dissipation by the battery feed circuit.

BRIEF DESCRIPTION OF THE DRAWINGS

A complete understanding of the invention together with its advantages and features may be obtained by considering the following detailed description and the appended drawings in which.

DETAILED DESCRIPTION

Figure 1:
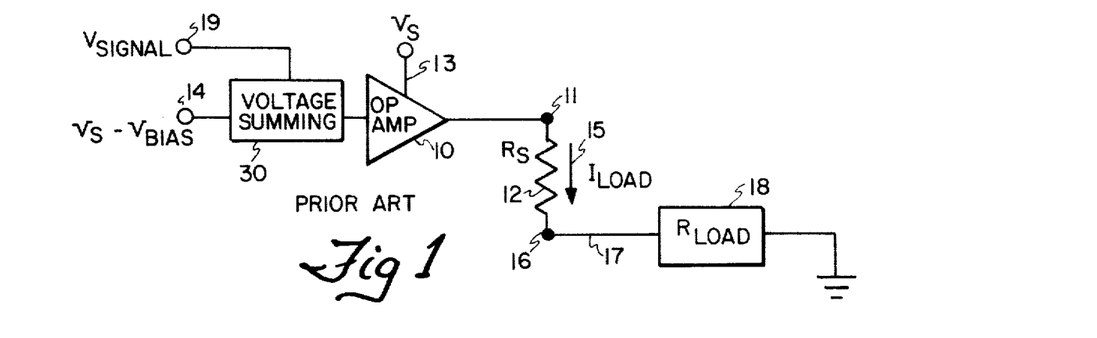
FIG. 1 is a simplified circuit schematic of the prior art.

FIG. 1 is a simplified representation of a prior art battery feed circuit. The subscriber loop is represented by a transmission line 17 and an element 18 represents the DC load impedance, $R_{Load}$, of the subscriber loop. The transmission line 17 is connected to the battery feed circuit through a terminal 16. A load current $I_{Load}$, is supplied to the tranmission line 17 by the output voltage of an operational amplifier 10 through a source impedance 12 having a value, $R_S$. The operational amplifier 10 is powered by a source of DC voltage (not shown) through a terminal 13. The DC input to the operational amplifier 10 is through a terminal 14. This input voltage is normally the supply voltage $V_S$, offset by a bias voltage, $V_{Bias}$. The source voltage is offset by the bias voltage so as to allow some voltage differential between the voltage supplied as power to the amplifier 10 and its input in order to allow the amplifier to function properly. The bias voltage is needed to insure that AC signals are not clipped by the limits of the operating range of the operational amplifier 10. Information is transferred to the subscriber loop by a voltage signal source through a terminal 19 which is superimposed on $V_S$-$V_{Bias}$ by a voltage summing subcircuit 30. The summed voltages are fed into the input of the amplifier 10. For illustrative purposes, $V_S$ is assumed to be positive with respect to ground and an arrow 15 indicates the direction of the load current.

Figure 2:
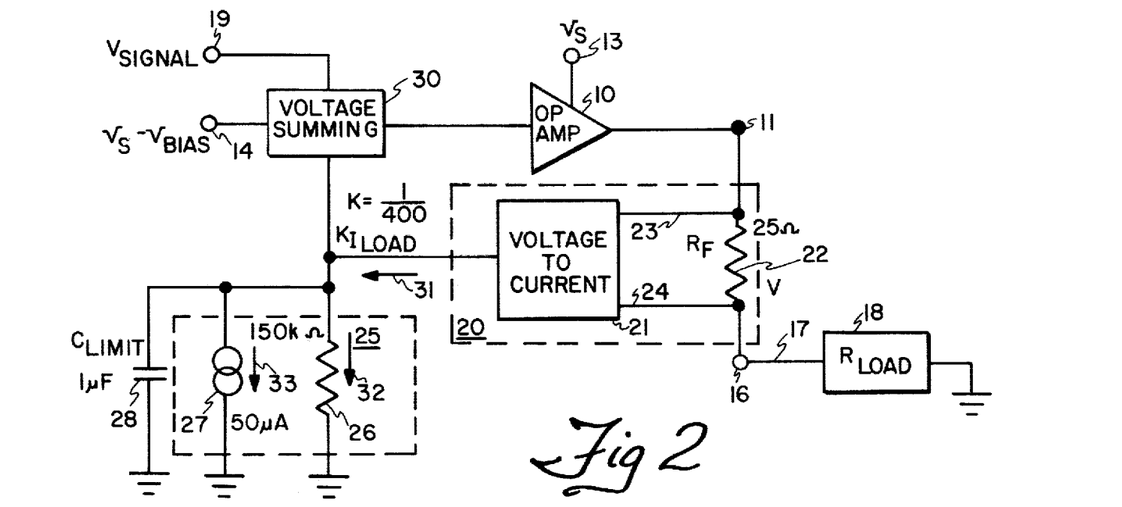
FIG. 2 is a simplified circuit schematic of the current-controlled feedback circuit of the present invention.

In contrast to previous battery feed circuits, a novel battery feed circuit with feedback is shown in FIG. 2. Hereafter, where the same element with the same function is used in a previous drawing, the same numbering is retained.

Between the circuit point 11 and the terminal 16 the battery feed circuit in FIG. 2 has a feedback circuit block 20 which generates a feedback current, $KI_{Load}$, which is proportional to the load current to the transmission line 17. Within the circuit block 20 shown by a dotted line there is a feedback impedance 22, denoted by $R_F$. The load current must pass through the impedance 22 thereby generating a voltage across the impedance. Two leads, 23 and 24, connected respectively on either side of the impedance 22 impress the voltage across the impedance into a voltage-to-current converter circuit block 21. The converter 21 generates the current, $KI_{Load}$.

This feedback current, whose direction is indicated by an arrow 31, is fed to an impedance means 25, indicated by an enclosing dotted line. The impedance means 25 has a resistance 26, $R_{control}$, through which the feedback current passes. This generates a voltage proportional to the feedback current. Connected in parallel to the resistance 26 is a current generator 27. It is connected so that it opposes the flow of the feedback current through the resistance 26. An arrow 33 illustrates the current directionality of the generator 27 as compared to the direction of the feedback current through the resistance 26 indicated by an arrow 32. Operation of the generator 27 is designed so that generated current matches the feedback current, $KI_{Load}$, when the feedback current is less than a maximum generated current, $I_{Limit}$ (a more detailed description of the generator 27 is made later). Since there is no current flowing through the resistance 26 until the feedback current exceeds the maximum generated current, $I_{Limit}$, the control voltage remains zero. When the feedback current exceeds the maximum generated current a control voltage is produced proportional to the feedback current, which in turn is proportional to the load current. Thus, the control voltage is proportional to the load current with an offset.

A capacitor 28 is also connected to the resistance 26 so as to shunt any AC voltages which may be generated across the resistance from the feedback current. In this way the feedback circuit responds only to low frequency signals (including DC).

The control voltage is then summed by a voltage summing circuit block 30 having, for example, a summing amplifier and voltage inverters, into the input of an operational amplifier 10, which is supplied by a DC source voltage through a terminal 13. The input to the amplifier 10 is the supply voltage minus a bias voltage and further minus the control voltage. This input then appears on the output of the amplifier 10 denoted by a circuit point 11. This output voltage is the driving voltage for the load current to the transmission line 17 through the terminal 16. From this relationship between the output voltage, the load current and the negative feedback relationship therebetween results the following equations for the load current:

$$I_{Load} = \frac{V_S - V_{Bias}}{R_F + R_{Load}} \text{ for } I_{Load} \leq \frac{I_{Limit}}{K}$$

$$I_{Load} = \frac{V_S - V_{Bias} + I_{Limit}R_{Control}}{R_F + KR_{Control} + R_{Load}} \text{ for } I_{Load} > \frac{I_{Limit}}{K}$$

Note that, as in FIG. 1, $v_{Signal}$ is superimposed upon the DC load current through the terminal 19 and the voltage summing subcircuit 30. Signal $v_{Signal}$ is not DC, it is not shown in the calculations above nor below.

Furthermore, it should be noted that the present invention has the feed back impedance 22 set at $R_F$ with low power dissipation as a goal. $R_F$ may not be a proper matching impedance for signals to and from the subscriber. A way of matching impedances with the subscriber at signal frequencies and leaving $R_F$ undisturbed for the DC load current is shown in a comparison application, Ser. No. 161,489, entitled, "Circuit with Feedback For Controlling the Impedance Thereof", filed June 20, 1980, by the present applicant.

This circuit is extremely useful because it guarantees a minimum load current and then, as the load impedance decreases, the load current does not increase as rapidly as the prior art circuit shown in FIG. 1. The rate of current increase is governed by the choice of value of $KR_{Control}$.

Figure 9:
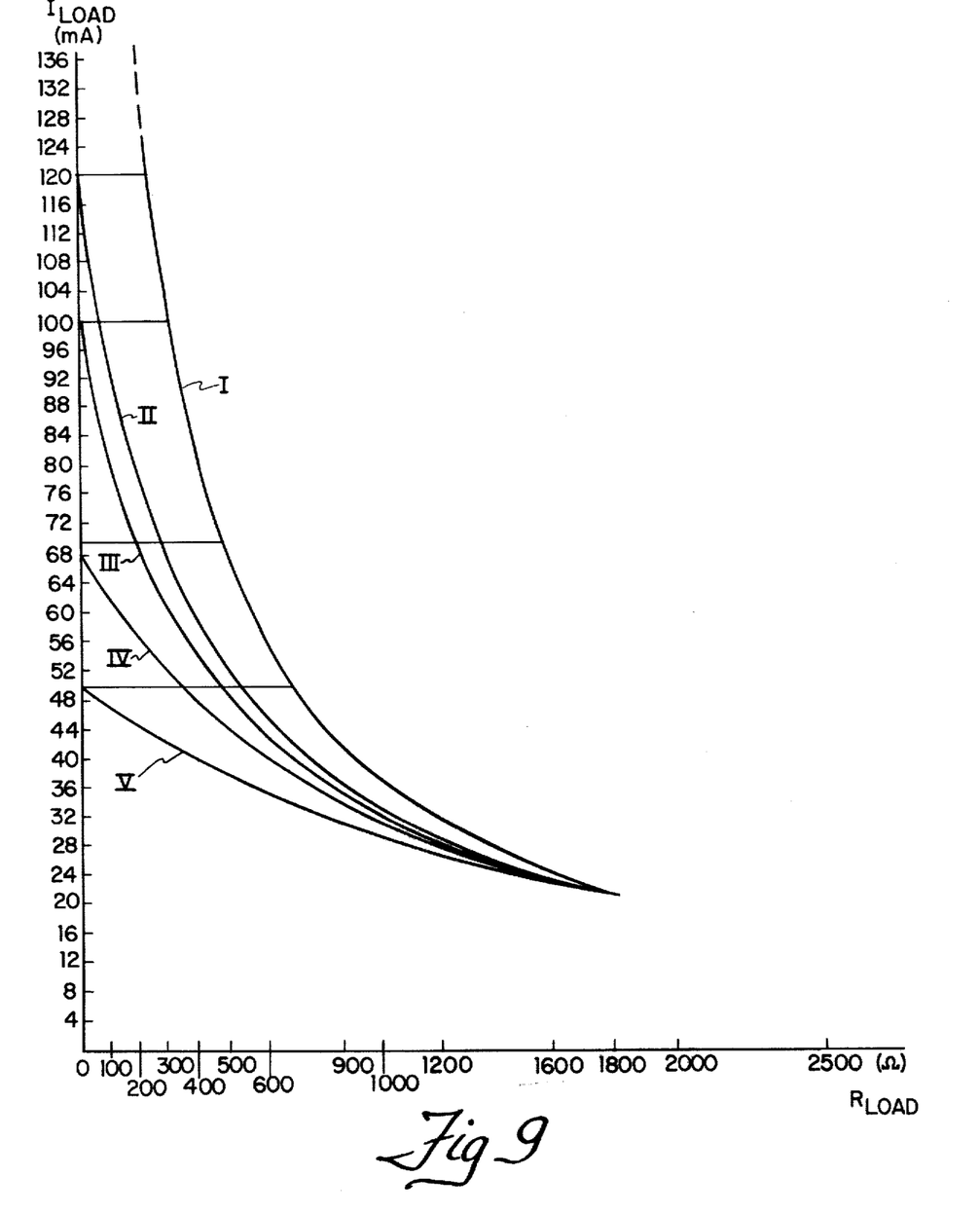
FIG. 9 is a graph demonstrating the efficacy of the current-controlled feedback circuit of the present invention.

FIG. 9 illustrates the reduction in load current possible by the feedback circuit of the present invention. In the drawing there is plotted the load current, $I_{Load}$, versus the load impedance, $R_{Load}$. Line II indicates the behavior of the load current as $R_{Load}$ is decreased for a conventional battery feed circuit with $R_S$ being 400Ω and $V_S$ being 48 volts according to telephone specifications. This satisfies the requirements that for a 1600 ohm load impedance a minimum load current of 23 milliamperes is generated, and for a transmission line short circuit, $I_{Load}$ does not exceed 120 milliamperes.

Lines III, IV, and V illustrate how the load current is greatly decreased by the feedback circuit of the present invention with $R_F$, replacing $R_S$, being only 50 ohms and the same source voltage. The values of K and $R_{Control}$ are chosen to have respective maximum load currents of 100, 70 and 50 milliamperes when the $R_{Load}$ equals zero. Values of K and $R_{Control}$ chosen to set the maximum load current to 120 milliamperes generate a characteristic similar to Line II.

Line I shows how unsuitable a prior art circuit with $R_S$ equal to 50 ohms would be.

Figures 4A, 4B, 5:
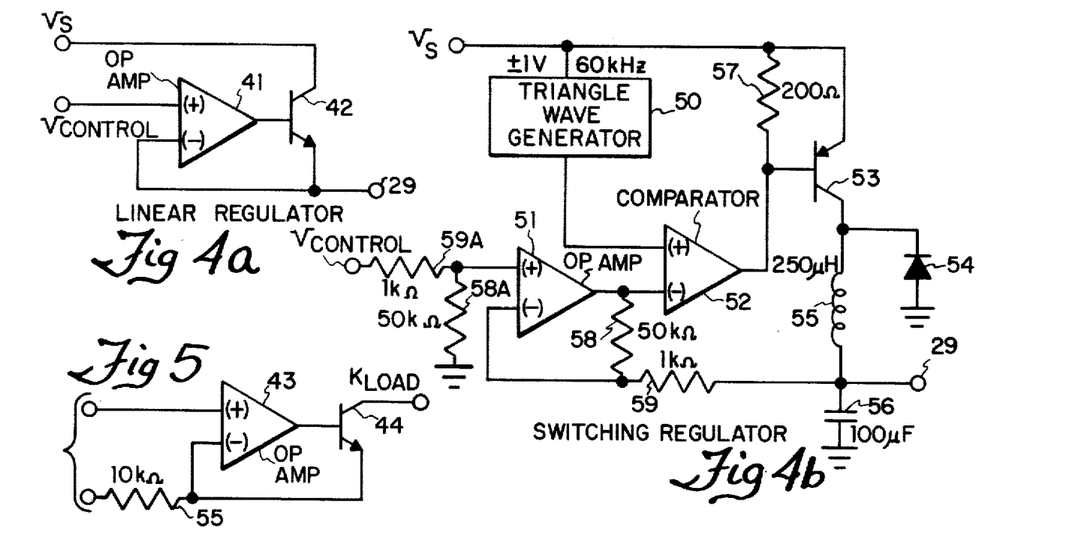
FIG. 4A shows a detailed circuit schematic of a linear regulator.
FIG. 4B shows a circuit schematic of a switching regulator.
FIG. 5 is a detailed circuit schematic of a voltage-to-current converter.
Figure 8:
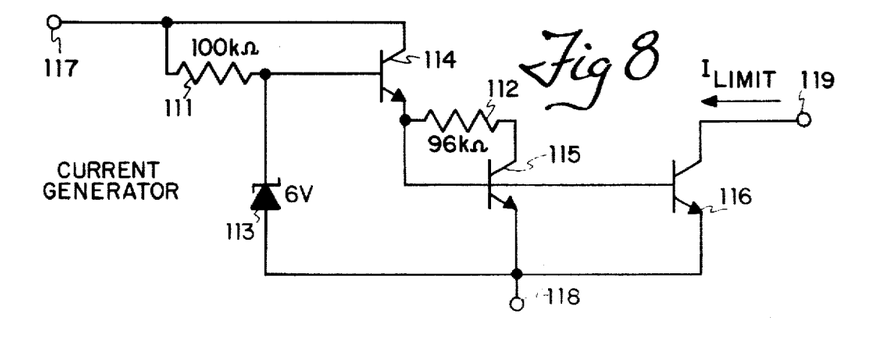
FIG. 8 is a detailed circuit schematic for a current generator.

FIGS. 5 and 8 explain some of the circuit blocks in FIG. 2. A current generator circuit operating as explained above is shown in FIG. 8. A terminal 117 is connected to a voltage source positive with respect to ground, to which a second terminal 118 is connected. A resistor 111 and a Zener diode 113 are connected in series between the terminals 117 and 118. Also connected to the terminal 117 is the collector of an NPN transistor 114 which has its base connected to a circuit point between the resistance 111 and the Zener diode 113. The emitter of the transistor 114 is connected to a resistance 112 which, in turn, has its other end connected to the bias-collector of a diode-connected NPN transistor 115. The emitter of the transistor 115 is connected to the terminal 118 and terminal 118 is further connected to the emitter of an NPN transistor 116 having its base connected to the base of the transistor 115. The generated current passes through the collector of the transistor 116 to a terminal 119 connected to a node 35 in FIG. 2.

An examination of this circuit reveals that a constant current flows through the resistance 112. The Zener diode 113 imposes a constant voltage across the resistance 112 (minus two base-emitter diode voltage drops); thus, the resistance 112 determines the current through the transistor 115. If the transistor 116 is in an active mode, then the same magnitude current is generated through the collector of the transistor 116 as through the transistor 115, since the emitters and bases of the transistors 115 and 116 are under identical conditions. This current is $I_{Limit}$, the maximum generated current.

However, it should be noted that the generated current cannot exceed the feedback current through the resistance 26. In that case, the transistor 116 would be in a saturated mode, not an active one. Thus, the generated current matches in magnitude the feedback current until $I_{Limit}$ is reached. As the feedback current increases further, the current generated remains at $I_{Limit}$.

Note that the current generator circuit can easily be designed to reverse the direction of its current.

Figure 3:
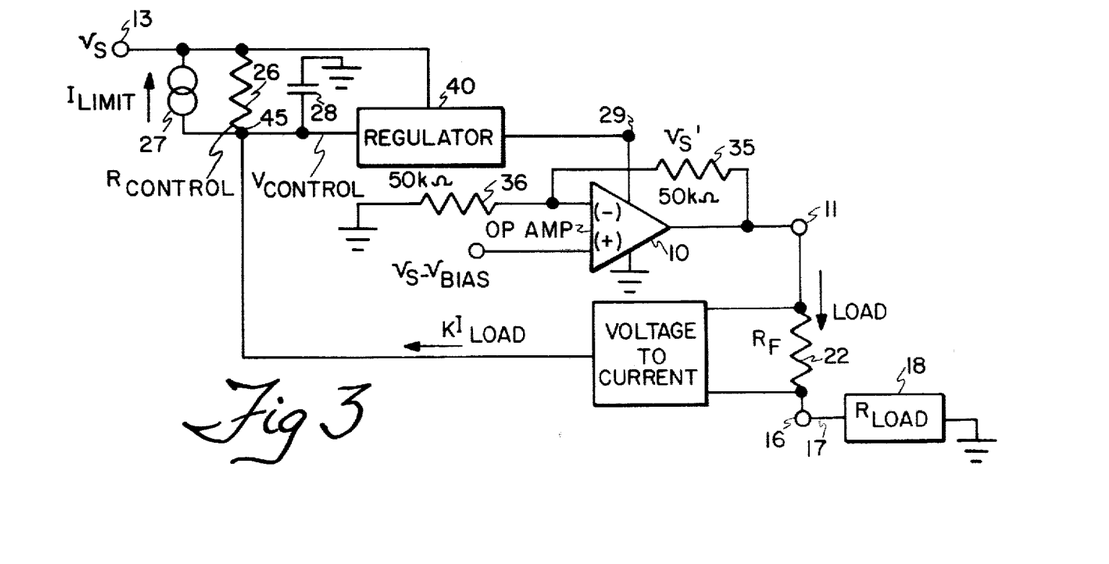
FIG. 3 illustrates the circuit having a current-controlled feedback with a regulator as a power supply to the amplifier.

FIG. 5 is a detailed schematic of the circuit for a voltage-to-current converter, denoted by the block symbol 21 in FIGS. 2 and 3. The voltage across the resistance 22, $I_{Load} R_F$, is fed into an operational amplifier 43 through its positive and negative terminals. A resistor 55 is connected in series to the negative input terminal of the amplifier 43. In turn, the output of the amplifier 43 is connected to the base of a transistor 44 whose emitter is connected in the feedback fashion to the negative input terminal of the amplifier 43. The collector of the transistor 44 is the output for the converter which will generate a current proportional by the factor K to the load current passing through the resistance 22.

The proportionality constant, K, is determined by the ratio of $R_F$ to the resistor 55. This can be seen by noting that ideally the input voltages of an operational amplifier are equal and no currents pass through them. The current passing through the resistance 55 is equal to the voltage across the resistance $R_F$ divided by the value of the resistance 55. This current, $KI_{Load}$, passes through the emitter of the transistor 44. The collector of the transistor 44 has nearly the same current as the emitter. Note that the direction of current can be reversed by changing the connections to $R_F$ and the transistor type to PNP.

FIG. 3 shows a battery feed circuit according to the present invention which has a regulator 40 interposed between the source of DC potential connected through the terminal 13 and the power supply for the operational amplifier 10. The feedback current, $KI_{Load}$, is generated by the voltage-to-current converter 31 responsive to the amount of load current flowing through the resistance 22 to the load 18 through the terminal 16. The feedback current passes through the resistance 26, $R_{Control}$, which generates a voltage proportional to the feedback current. At one end, the resistance 26 is connected to the supply voltage. At a node point 45 the resistance 26 produces a control voltage which is equal to the supply voltage minus the voltage drop across the resistance 26. The control voltage is the input to the regulator 40 which follows this voltage in its output terminal. A circuit point 29 represents the output terminal of the regulator 40. The regulator output supplies the amplifier 10, which is set up in a non-inverting gain of two mode with a resistance 35 and having a value equal that of a resistance 36. The input of the amplifier 10 is taken from a bias circuit (not shown) which generates an input voltage equal to one half of the control voltage minus the bias voltage. The amplifier, being a non-inverting gain of two circuit, produces twice this voltage on its output, denoted by the circuit point 11.

This circuit has three advantages. First, it has the negative feedback as in the circuit in FIG. 2, which reduces the increase in the load current as the load impedance decreases. The power dissipation in the entire system is lowered because less current flows through the battery feed circuit and through load 18.

Secondly, the use of a voltage regulator 40 ensures a more stable voltage supply to the circuit for better operation.

Finally, the circuit in FIG. 3 can lower power dissipation by using a switching regulator for the regulator 40. In an amplifier, power is dissipated according to the amount of voltage drop between the power supply of the amplifier and its output. The present circuit has the amount of voltage drop due to the feedback loop, $V_S$ minus $V_{Control}$, occuring in the regulator 40 rather than the amplifier 10. Of the power dissipated, $I_{Load}((KI_{Load}-I_{Limit})R_{Control})$, belongs to the regulator 40 and $I_{Load}V_{Bias}$ belongs to the amplifier 10 when $I_{Load}$ is greater than $I_{Limit}/K$. If $V_{Bias}$ is small relative to $V_S$ and $R_F$ is small, then the majority of power for heavy loads (low $R_{Load}$) is dissipated by the regulator 40. Typically, to operate in a telephone system, the present invention has $V_S$ to be 48 volts, $V_{Bias}$ 3 volts and $R_F$ 50 ohms. If the amplifier 40 is designed to be a switching type, a significant savings in power can be accomplished over a standard linear regulator.

FIG. 4A shows the circuit schematic of a typical linear regulator. The voltage source, $V_S$, is connected to the collector of a power transistor 42, capable of handling the power loads. The base of the transistor 42 receives the output of an operational amplifier 41. The emitter of the transistor 42 forms the output of the regulator here shown connected to the circuit point 29 in the circuit of FIG. 3. The emitter is also connected in a feedback loop to the negative input of the operational amplifier 41. The positive input of the operational amplifier receives a reference voltage, here denoted by $V_{Control}$, which subsequently appears as the output of the linear regulator at the point 29.

The linear regulator is compatible with the rest of the circuit. An operational amplifier, such as that shown as 41, is easily integrable and the transistor 42 can be connected as a discrete element for purposes of isolating it from the rest of the circuit because of its high power dissipation. FIG. 4B illustrates a switching regulator serving the same function. The supply voltage, $V_S$, is connected to a triangle wave generator 50. The generator is shown operating at a frequency of 60 kHz to avoid audio frequency noise in a telephone system. The output of the generator 50 is connected to one input of a comparator 52. The output of the comparator is connected to one end of a resistance 57 and the base of a transistor 53. The other end of the resistor 57 and the emitter of the transistor 53 is connected to the supply voltage. The collector of the transistor 53 is connected to a diode 54 having its other end connected to ground. The collector of the transistor 53 is also connected to an inductor 55 at one end. The other end of the inductor is connected to the output lead of the switching regulator connected to the circuit point 29. The output of the switching regulator is also connected to a capacitor 56 which is connected to ground at its other end. The purpose of the capacitor is to filter out any AC signals and store DC energy. Furthermore, the output is fed back to an operational amplifier 51. The feedback signal passes through the resistance 59 and then into the negative input of the amplifier 51. The negative input of the amplifier 51 is also connected to its output through a resistance 58 which is equal in value to the resistance 59. The output of the amplifier 51 is connected into the input of the comparator 52. The positive input of the amplifier 51 receives the reference voltage, $V_{Control}$. The circuit operates so that the difference between $V_{Control}$ and the regulator output is amplified and used to adjust the duty cycle of the comparator output whose frequency is set by the triangle wave generator. The duty cycle of the comparator output sets the relative on and off times of the transistor 53 which in turn modifies the output voltage. This negative feedback loop forces the output voltage towards $V_{Control}$. As is known to those skilled in the art, the reference voltage multiplied by the resistor ratios will appear at the circuit point 29 with a significant savings in power dissipation as compared to a standard linear regulator as exemplified by the circuit in FIG. 4A.

Figure 6:
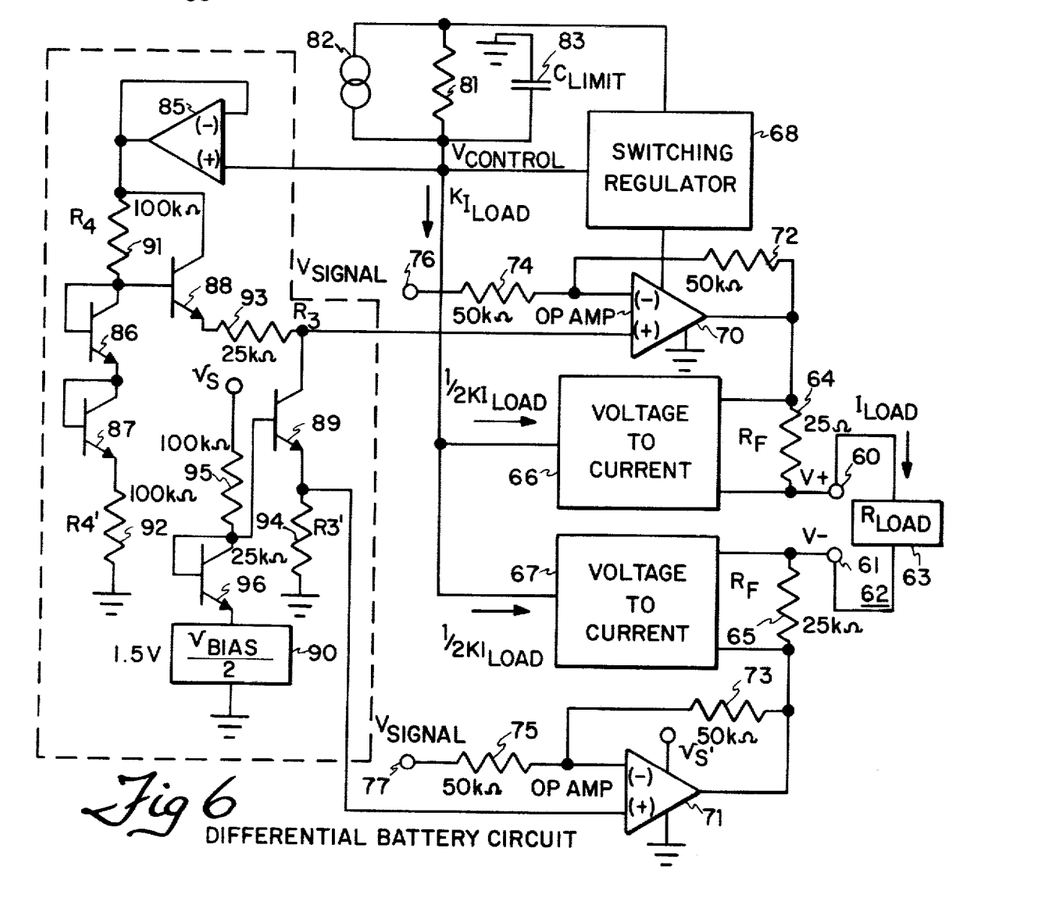
FIG. 6 illustrates a differential battery feed circuit of the present invention.

A differential battery feed circuit in accordance with the circuit in FIG. 3 is presented in FIG. 6. The load is shown in the form of a subscriber line loop 62 having a load impedance denoted by a block 63. The loop 62 is connected to two terminals, 60 and 61, of the battery feed circuit. Two feedback resistors, 64 and 65, having small values, 25 ohms each, are respectively connected to voltage-to-current convertors 66 and 67. These generate two feedback currents proportional to the current load passing through the transmission line 62. These two feedback currents from the two legs of the battery feed circuit are combined into one feedback current which passes through a resistance 81. In a manner as described previously, a current generator 82 is connected to the resistance 81 to put an offset into the control voltage created by the passage of the feedback current through the resistance 81. Likewise, a capacitor 83 is connected to the resistance 81 in a manner so as to filter out all AC signals or signal voltages appearing on the feedback current.

It should be noted that optimally the proportionality constants of the convertors 66 and 67 should be equal so as to avoid the feedback of longitudinal mode signals generated on the line 62. A longitudinal mode signal would appear on the terminals 60 and 61 with the same directional polarity thereby generating the feedback currents from the convertors 66 and 67 in opposite directions. If the two proportionality constants are equal, then the feedback current components corresponding to the longitudinal mode signal will cancel each other.

The control voltage generated by the total feedback current through the resistance 81 is connected to a switching regulator 68 as a reference voltage. The switching regulator 68 is powered by the voltage supply and its output is the supply voltage minus the control voltage component across a resistor 81.

A suitable bias circuit for the amplifiers 70 and 71 is also shown in FIG. 6. The control voltage is fed into an operational amplifier 85 connected in a voltage follower mode acting as a buffer for the bias circuit. The output of the amplifier 85 has a resistance 91, two diode-connected transistors 86 and 87, and resistance 92 connected in series to ground. The resistances 91 and 92 are equal. Another transistor 88, having its collector directly connected to the output of the amplifier 85 and its base connected to the base-collector of the transistor 86, is connected to a resistance 93 by its emitter. At its other end the resistance 93 is connected to the collector of a transistor 89 which has its emitter connected to ground through a resistance 94. The resistance 94 is equal to the resistance 93. The base of the transistor 89 is connected to the base-collector of a diode-connected transistor 96. The base-collector of a transistor 96 is also connected to the supply voltage through a resistance 95. The emitter of the transistor 91 is connected to a voltage generation source 90 having a voltage one-half of the desired bias voltage, $V_{Bias}$.

An analysis of the circuit indicates that the voltage at a circuit point between the resistance 93 and the transistor 89 has a voltage equal to the control voltage minus the desired bias voltage, all divided by two. This voltage is fed into the positive input of the operational amplifier 70, which is connected in a voltage follower mode. A resistance 72 is connected between the output of the amplifier 70 and its negative input. A resistance 74 is also connected in series between the negative input of the amplifier 70 and a terminal 76. The equality of the two resistances 72 and 74 insures the output of the control voltage minus the bias voltage.

Similarly, positive input of the operational amplifier 71 is connected between the emitter of the transistor 89 and the resistance 94 which as a voltage of one-half the bias voltage. Equal resistances 73 and 75 connect the amplifier 71 in the voltage follower mode so that the output of the amplifier is equal to the bias voltage.

Thus, the circuit in FIG. 6 has two amplifiers which differentially drive the load current through the subscriber loop 62. Both the amplifiers 70 and 71 have a negative feedback control corresponding to the amount of load current flowing through the loop 62 for lowered power dissipation. Furthermore, each of the amplifiers 70 and 71 have only the bias voltage drop causing power dissipation. The amplifier 70 has a bias voltage drop between its power source, the switching regulator 68, and its output. The amplifier 71 has a voltage drop between ground and its output. Therefore, a significant savings in power is achieved.

Figure 7:
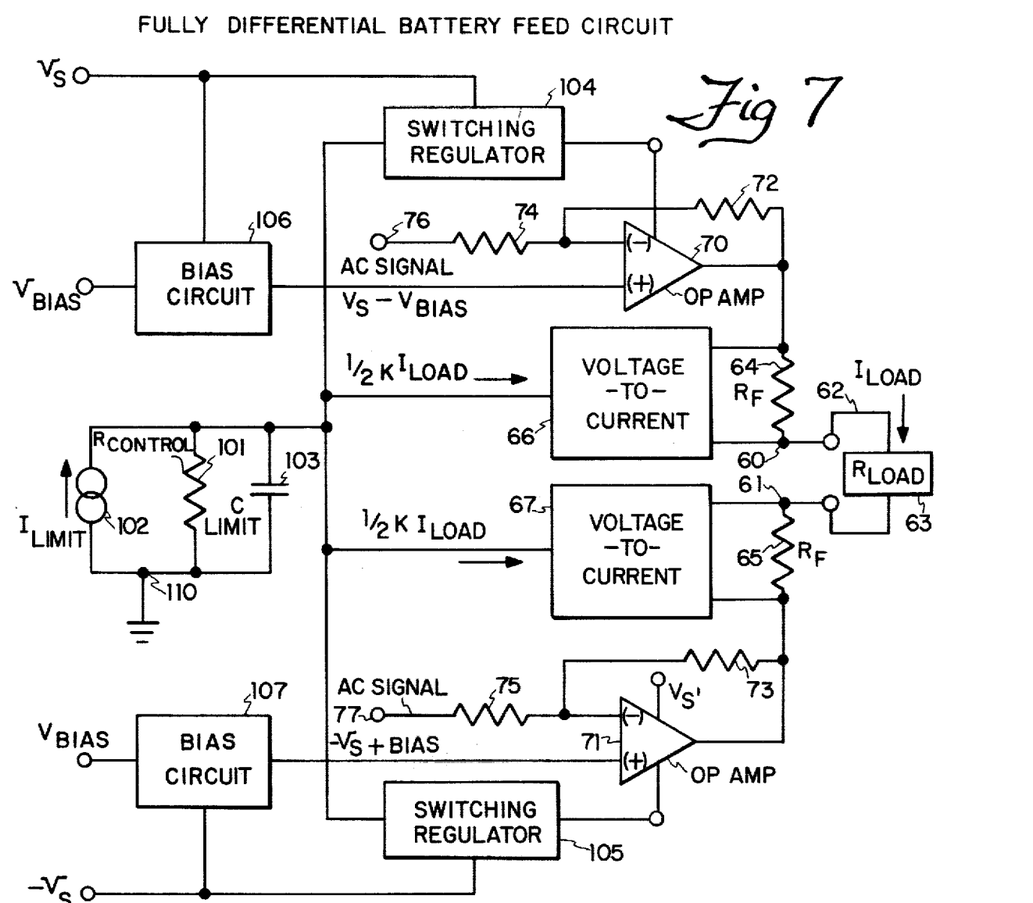
FIG. 7 shows another differential battery feed of the present invention.

FIG. 7 is a schematic diagram of a differential circuit as in the previous drawing, but it is fully differential, having a switching regulator 105 power the amplifier 71 instead of ground as in the previous circuit. Note that while one end of the impedance means comprising the resistance 101 and the current 102 is connected to ground, the circuit will function properly even if the supply voltages are changed as long as the circuit point 110 is connected to a voltage midway between the two voltage supplies.

It should finally be pointed out that though the description it its more detailed aspects has been directed toward a battery feed circuit for a subscriber line in a telephone system, this invention should by no means be so limited.

What is claimed:

1. A battery feed circuit for supplying a D.C. load current to a load from a source of D.C. voltage comprising
   feedback means responsive to said load current for generating a feedback current proportional to said load current,
   impedance means responsive to said feedback current for generating a control voltage proportional to said feedback current,
   bias means responsive to said D.C. source voltage for generating a biased voltage having a predetermined relationship with respect to said source voltage,
   amplifier means responsive to said biased voltage and control voltage for generating an output voltage in a negative feedback relationship to said load current, said output voltage driving said load current.

2. A battery feed circuit as in claim 1 wherein said impedance means further comprises
   first resistive means generating said control voltage by the flow of said feedback current therethrough,
   means parallel connected to said resistive means for generating a second current through said resistive means in a manner that said control voltage is generated only when said feedback current is above a predetermined value.

3. A battery feed circuit as in claim 2 wherein said feedback means further comprises
   second resistive means serially connected between the output of said amplifier means and said load, said second resistive means receiving said load current therethrough,
   means responsive to the voltage across said second resistive means for converting said voltage into said feedback current whereby a feedback current proportional to said load current is generated.

4. A battery feed circuit for supplying a D.C. load current to a load from a source of D.C. voltage comprising
   feedback means responsive to said load current for generating a current proportional to said load current,
   impedance means responsive to said feedback current for generating a control voltage component proportional to said feedback current, said impedance means being further responsive to said D.C. source voltage for generating a control voltage substantially equal to said source voltage modified by said control voltage component,
   regulator means supplied by said D.C. voltage source and responsive to said control voltage for generating an output voltage substantially equal to said control voltage,
   bias means responsive to said control voltage for generating a biased voltage having a predetermined relationship with respect to said control voltage,
   amplifier means supplied by regulator output voltage and responsive to said biased voltage for generating an output voltage in a negative feedback relationship to said load current, said amplifier output voltage driving said load current.

5. A battery feed circuit as in claim 4 wherein said regulator means comprises a switching regulator.

6. A battery feed circuit as in claim 4 wherein said impedance means further comprises
   resistive means connected between said D.C. voltage source and said feedback means for generating a control voltage differing from said source voltage by said control voltage component formed by said feedback current through said resistive means.

7. A battery feed circuit as in claim 6 wherein said impedance means further comprises
   current generating means connected in parallel with said resistive means in such a manner that said control voltage component is null until said feedback current exceeds a predetermined value.

8. The battery feed circuit as in claim 7 further comprising capacitive means connected in parallel with said resistive means and said current generating means for differentiating the high frequency impedance of said circuit with respect to the low frequency impedance thereof.

9. The battery feed circuit as in claim 8 wherein said feedback means further comprises
   second impedance means serially connected between the output of said amplifier means and said load, said second impedance means receiving said load current therethrough,
   means responsive to the voltage across said second impedance means for converting said voltage into said feedback current whereby a feedback current proportional to said load current is generated.

10. A differential battery feed circuit for supplying a D.C. load current from a source of D.C. voltage supply to a transmission loop through a first and a second terminal comprising
    first means associated with said first terminal for generating a first feedback current proportional to said load current
    second means associated with said second terminal for generating a second feedback current proportional to said load current
    impedance means responsive to said first feedback current and said second feedback current for generating a control voltage component proportional to said first feedback current and said second feedback current, said impedance means being further responsive to said D.C. source voltage for generating a control voltage substantially equal to said source voltage modified by said control voltage component,
    regulator means supplied by said D.C. voltage source and responsive to said control voltage for generating an output voltage substantially equal to said control voltage,
    bias means responsive to said control voltage for generating a first biased voltage having a first predetermined relationship with respect to said control voltage and for generating a second biased voltage having a second predetermined relationship with respect to said control voltage, first amplifier means supplied by said regulator means and responsive to said first biased voltage for producing a first output voltage, and second amplifier means supplied by said regulator means and responsive to said second biased voltage for producing a second output voltage, the difference in said first and second output voltages driving said load current through said transmission loop in a negative feedback relationship to said load current.

11. A battery feed circuit as in claim 10 wherein said regulator means comprises a switching regulator.

12. The battery feed circuit as in claim 10 wherein said impedance means further comprises a resistive means connected between said D.C. voltage source and said first and second feedback current generating means for producing said control voltage offset from said source voltage by said control voltage component proportional to the sum of said first and second feedback currents.

13. The battery feed circuit as in claim 12 wherein said impedance means further comprises current generating means connected in parallel with said resistive means in such a manner that said control voltage component is null until the sum of said first and second feedback currents exceed a predetermined value.

14. The battery feed circuit as in claim 13 wherein said impedance means further comprises capacitive means connected in parallel to said resistive means and said current generating means for differentiating the high frequency impedance of said circuit with respect to the low frequency impedance thereof.

15. A differential battery feed circuit for supplying a D.C. load current to a transmission loop through a first and a second terminal associated with a first D.C. voltage source and a second D.C. voltage source respectively, comprising first means associated with said first terminal for generating a first feedback current proportional to said load current, second means associated with said second terminal for generating a second feedback current proportional to said load current, impedance means responsive to said first feedback current and said second feedback current for generating a control voltage component proportional to said first feedback current and said feedback current, first regulator means supplied by said first D.C. voltage source and responsive to said control voltage component for producing a first control voltage substantially equal to said first source voltage modified by said control voltage component, second regulator means supplied by said second D.C. voltage source and responsive to said control voltage component for producing a second control voltage substantially equal to said second source voltage modified by said control voltage component, bias means responsive to said first and second control voltages for producing a first biased voltage having a first predetermined relationship to said first control voltage and a second biased voltage having a second predetermined relationship to said second control voltage, first amplifier means supplied by said first switching regulator means and responsive to said first biased voltage for producing a first output voltage, and second amplifier means supplied by said second switching regulator means and responsive to said second biased voltage for producing a second output voltage, the difference in said first and second output voltages driving said load current through said transmission loop in a negative feedback relationship to said load current.

16. A battery feed circuit as in claim 15 wherein said first and said second regulators means comprise switching regulators.

* * * * *